United States Patent
Igarashi et al.

(10) Patent No.: US 9,267,016 B2
(45) Date of Patent: Feb. 23, 2016

(54) VINYLIDENE FLUORIDE POLYMER POWDER AND VINYLIDENE FLUORIDE POLYMER SOLUTION

(75) Inventors: Tamito Igarashi, Tokyo (JP); Hiroshi Sakabe, Tokyo (JP); Emi Sugawara, Tokyo (JP); Shintarou Mutou, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 539 days.

(21) Appl. No.: 13/503,876

(22) PCT Filed: Oct. 28, 2010

(86) PCT No.: PCT/JP2010/069131
§ 371 (c)(1),
(2), (4) Date: Apr. 25, 2012

(87) PCT Pub. No.: WO2011/052666
PCT Pub. Date: May 5, 2011

(65) Prior Publication Data
US 2012/0208085 A1    Aug. 16, 2012

(30) Foreign Application Priority Data
Oct. 30, 2009    (JP) ................................. 2009-250650

(51) Int. Cl.
| H01M 6/14 | (2006.01) |
| H01M 6/04 | (2006.01) |
| C08K 5/3415 | (2006.01) |
| H01G 11/38 | (2013.01) |
| H01M 4/62 | (2006.01) |
| H01G 11/48 | (2013.01) |

(52) U.S. Cl.
CPC ............. *C08K 5/3415* (2013.01); *H01G 11/38* (2013.01); *H01G 11/48* (2013.01); *H01M 4/62* (2013.01); *H01M 4/621* (2013.01); *Y02E 60/13* (2013.01); *Y10T 428/2982* (2015.01)

(58) Field of Classification Search
USPC ................... 429/303, 306, 309, 199; 526/255
See application file for complete search history.

(56) References Cited

U.S. PATENT DOCUMENTS

| 4,914,158 A | * | 4/1990 | Yoshimura et al. ........... 525/199 |
| 5,346,727 A | | 9/1994 | Simkin |
| 5,405,912 A | | 4/1995 | Simkin |
| 6,365,243 B1 | | 4/2002 | Otani et al. |
| 6,428,934 B1 | | 8/2002 | Hatazawa et al. |
| 6,806,332 B2 | | 10/2004 | Royer et al. |
| 6,867,273 B2 | * | 3/2005 | Lannuzel et al. ............. 526/250 |
| 8,337,725 B2 | * | 12/2012 | Abusleme et al. ............. 252/511 |
| 8,785,580 B2 | * | 7/2014 | Amin-Sanayei ............. 526/255 |

(Continued)

FOREIGN PATENT DOCUMENTS

| CN | 101044173 A | 9/2007 |
| CN | 101072801 A | 11/2007 |
| JP | 50-161320 | 12/1975 |
| JP | 6108103 A | 4/1994 |
| JP | 8034820 A | 2/1996 |

(Continued)

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Provided is a vinylidene fluoride polymer powder exhibiting excellent solubility in aprotic polar solvents, and a vinylidene fluoride polymer solution obtained from the powder and an aprotic polar solvent. The vinylidene fluoride polymer powder has an NMP penetration rate of 12 to 100% as measured by an NMP penetration test.

17 Claims, 1 Drawing Sheet

(56) References Cited

U.S. PATENT DOCUMENTS

2007/0290407 A1 12/2007 Ikeda
2008/0071045 A1 3/2008 Kawakami
2009/0087743 A1 4/2009 Kim et al.
2009/0203864 A1 8/2009 Amin-Sanayei
2010/0270509 A1 10/2010 Sakuma et al.

FOREIGN PATENT DOCUMENTS

| JP | 10298298 A | 11/1998 |
| JP | 2003-514083 A | 4/2003 |
| TW | 431015 B | 4/2001 |
| WO | 2008005745 A2 | 1/2008 |
| WO | 2009047969 A1 | 4/2009 |

* cited by examiner

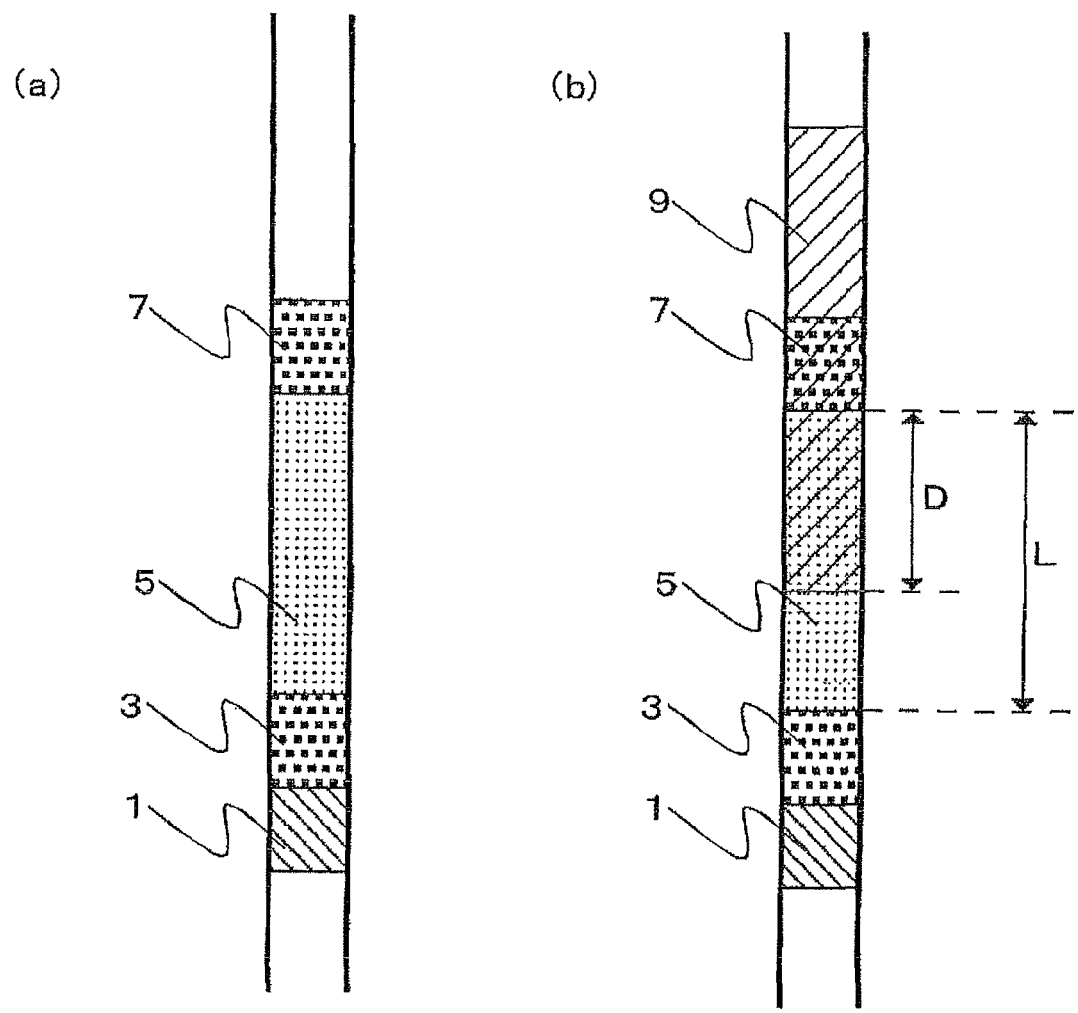

VINYLIDENE FLUORIDE POLYMER POWDER AND VINYLIDENE FLUORIDE POLYMER SOLUTION

TECHNICAL FIELD

The present invention relates to vinylidene fluoride polymer powder and a vinylidene fluoride polymer solution. In detail, the invention relates to vinylidene fluoride polymer powder which exhibits excellent solubility in aprotic polar solvents such as N-methyl-2-pyrrolidone, and to a vinylidene fluoride polymer solution obtained from the polymer powder and an aprotic polar solvent.

BACKGROUND ART

A vinylidene fluoride polymer solution that is obtained by dissolving vinylidene fluoride polymer powder in N-methyl-2-pyrrolidone (hereinafter, also referred to as NMP) is used as a binder for lithium ion secondary battery.

In general, the binding force of vinylidene fluoride polymer powder serving as a binder increases with increasing molecular weight of the polymer. However, a polymer having a higher molecular weight requires a longer time to be dissolved in NMP, thereby deteriorating the productivity.

The reasons why the dissolution takes a long time include the facts that vinylidene fluoride polymer particles themselves become less soluble with increasing molecular weight and such vinylidene fluoride polymer particles adhere to each other in NMP so as to form large masses (hereinafter, also referred to as lumps).

In particular, because lumps prevent NMP from penetrating through the inside of lumps, the formation of lumps in NMP causes a very long time for vinylidene fluoride polymer powder to be dissolved in NMP.

A known method for dissolving a vinylidene fluoride polymer is to disperse vinylidene fluoride polymer powder in a poor solvent and thereafter stir the dispersion in a good solvent so as to dissolve the polymer (see, for example, Patent Literature 1). According to the method described in Patent Literature 1, acetone, tetrahydrofuran or the like is used as the poor solvent, and NMP or the like is used as the good solvent. The method disclosed in Patent Literature 1 is capable of dissolving a vinylidene fluoride polymer by a very simple technique. However, the method of Patent Literature 1 is complicated due to the need of dispersing vinylidene fluoride polymer powder in a poor solvent and thereafter stirring the dispersion in a good solvent, and tends to be unsatisfactory in terms of productivity. This literature also discloses an embodiment in which the poor solvent is removed from the vinylidene fluoride polymer solution. However, performing such a step of removing the poor solvent adds costs.

Porous vinylidene fluoride polymer powder is known to exhibit excellent solubility in NMP (see, for example, Patent Literature 2). The vinylidene fluoride polymer powder disclosed in Patent Literature 2 can be obtained by a supercritical suspension polymerization method having a step of suspending a vinylidene fluoride monomer and a step of performing supercritical polymerization. However, because the vinylidene fluoride polymer powder described in Patent Literature 2 is not particularly designed so as to prevent the formation of lumps, lumps can be formed to cause a decrease in solubility when the vinylidene fluoride polymer powder is dispersed in a solvent in an inappropriate manner.

CITATION LIST

Patent Literatures

Patent Literature 1: JP-A-H10-298298
Patent Literature 2: WO 2009/047969

SUMMARY OF INVENTION

Technical Problem

The present invention has been made in view of the problems in the art described above. It is therefore an object of the invention to provide vinylidene fluoride polymer powder that exhibits higher solubility in aprotic polar solvents such as NMP than heretofore achieved, and a vinylidene fluoride polymer solution obtained from the powder and an aprotic polar solvent.

Solution to Problem

The present inventors carried out studies in order to achieve the above object. They have then found that specific vinylidene fluoride polymer powder exhibits excellent solubility with respect to aprotic polar solvents such as NMP. The present invention has been completed on the basis of this finding.

Vinylidene fluoride polymer powder according to the present invention has an N-methyl-2-pyrrolidone penetration rate of 12 to 100% as measured by an N-methyl-2-pyrrolidone penetration test described below:

N-methyl-2-pyrrolidone penetration test: A glass tube 8 mm in inner diameter which is packed with absorbent cotton at a lower portion is allowed to stand vertically. 1 g of sea sand having a particle diameter of 0.1 to 0.3 mm is packed on the absorbent cotton so as to form a lower sea sand layer in such a manner that the surface of the sea sand layer becomes flat. 1 g of the vinylidene fluoride polymer powder is packed on the surface of the lower sea sand layer so as to form a vinylidene fluoride polymer powder layer in such a manner that the boundary surface between this layer and the lower sea sand layer as well as the surface of the vinylidene fluoride polymer powder layer become flat. 1 g of sea sand having a particle diameter of 0.1 to 0.3 mm is packed on the surface of the vinylidene fluoride polymer powder layer so as to form an upper sea sand layer in such a manner that the boundary surface between this layer and the vinylidene fluoride polymer powder layer as well as the surface of the sea sand layer become flat.

Subsequently, 5 mL of N-methyl-2-pyrrolidone stained with methylene blue (methylene blue concentration: 0.05% by mass) (liquid temperature: 23° C.) is poured onto the surface of the upper sea sand layer. After the passage of 3 minutes from the pouring, the depth of penetration of the methylene blue-stained N-methyl-2-pyrrolidone into the vinylidene fluoride polymer powder layer and the thickness of the vinylidene fluoride polymer powder layer are measured. The penetration depth is divided by the thickness of the vinylidene fluoride polymer powder layer and the quotient is multiplied by 100 (100× penetration depth/thickness of vinylidene fluoride polymer powder layer) to give an N-methyl-2-pyrrolidone penetration rate.

The vinylidene fluoride polymer powder preferably contains vinylidene fluoride-derived monomer units at not less than 80 mol %.

The vinylidene fluoride polymer powder preferably has a weight average molecular weight of not less than 200000 as measured by gel permeation chromatography relative to polystyrenes.

Preferably, differential scanning calorimetry of the vinylidene fluoride polymer powder gives a DSC curve which has two or more crystal melting peaks and in which at least one sub-peak is observed at a temperature that is not less than 110° C. and is lower than the temperature giving rise to the crystal melting peak having the largest peak area (the main peak).

The vinylidene fluoride polymer powder preferably has a median diameter of 1 to 250 μm.

A vinylidene fluoride polymer solution according to the present invention is obtained from the vinylidene fluoride polymer powder and an aprotic polar solvent.

Preferably, the vinylidene fluoride polymer solution of the invention is obtained from the vinylidene fluoride polymer powder and N-methyl-2-pyrrolidone.

A power storage device electrode slurry according to the present invention is formed from the vinylidene fluoride polymer solution and an active substance.

A power storage device electrode slurry according to another aspect of the present invention may be formed from a mixture including the vinylidene fluoride polymer powder and an active substance, and an aprotic polar solvent.

A power storage device electrode according to the present invention is produced from the power storage device electrode slurry and a collector.

Advantageous Effects of Invention

The vinylidene fluoride polymer powder according to the invention achieves higher solubility with respect to aprotic polar solvents such as NMP than conventional vinylidene fluoride polymer powders.

BRIEF DESCRIPTION OF DRAWINGS

FIG. 1 FIGURE (a) is a schematic view illustrating a configuration of layers in a glass tube which are used in order to perform an N-methyl-2-pyrrolidone penetration test. FIGURE (b) is a schematic view illustrating layers after the passage of 3 minutes from the pouring of methylene blue-stained N-methyl-2-pyrrolidone in an N-methyl-2-pyrrolidone penetration test.

DETAILED DESCRIPTION OF THE INVENTION

The present invention will be described in greater detail hereinbelow.

(Vinylidene Fluoride Polymer Powder)

Vinylidene fluoride polymer powder according to the present invention has an N-methyl-2-pyrrolidone penetration rate of 12 to 100% as measured by an N-methyl-2-pyrrolidone penetration test described below. The inventive vinylidene fluoride polymer powder is excellent in terms of the N-methyl-2-pyrrolidone penetration rate. The N-methyl-2-pyrrolidone penetration rate is preferably 19 to 100%. The above range of N-methyl-2-pyrrolidone penetration rate ensures that the vinylidene fluoride polymer powder can be dissolved in an aprotic polar solvent such as NMP without forming lumps in the aprotic polar solvent, thereby reducing the stirring time required in order to form a vinylidene fluoride polymer solution.

In order for the inventive vinylidene fluoride polymer powder to be distinguished from conventional vinylidene fluoride polymer powders, the inventive powder will be sometimes referred to as vinylidene fluoride polymer powder (A).

N-methyl-2-pyrrolidone penetration test: A glass tube 8 mm in inner diameter which is packed with absorbent cotton at a lower portion is allowed to stand vertically. 1 g of sea sand having a particle diameter of 0.1 to 0.3 mm is packed on the absorbent cotton so as to form a lower sea sand layer in such a manner that the surface of the sea sand layer becomes flat. 1 g of the vinylidene fluoride polymer powder is packed on the surface of the lower sea sand layer so as to form a vinylidene fluoride polymer powder layer in such a manner that the boundary surface between this layer and the lower sea sand layer as well as the surface of the vinylidene fluoride polymer powder layer become flat. 1 g of sea sand having a particle diameter of 0.1 to 0.3 mm is packed on the surface of the vinylidene fluoride polymer powder layer so as to form an upper sea sand layer in such a manner that the boundary surface between this layer and the vinylidene fluoride polymer powder layer as well as the surface of the sea sand layer become flat.

Subsequently, 5 mL of N-methyl-2-pyrrolidone stained with methylene blue (methylene blue concentration: 0.05% by mass) (liquid temperature: 23° C.) is poured onto the surface of the upper sea sand layer. After the passage of 3 minutes from the pouring, the depth of penetration of the methylene blue-stained N-methyl-2-pyrrolidone into the vinylidene fluoride polymer powder layer and the thickness of the vinylidene fluoride polymer powder layer are measured. The penetration depth is divided by the thickness of the vinylidene fluoride polymer powder layer and the quotient is multiplied by 100 (100× penetration depth/thickness of vinylidene fluoride polymer powder layer) to give an N-methyl-2-pyrrolidone penetration rate.

The N-methyl-2-pyrrolidone penetration test will be described in further detail with reference to FIG. 1. In order to carry out the N-methyl-2-pyrrolidone penetration test, first, a glass tube 8 mm in inner diameter which is packed with absorbent cotton 1 at a lower portion is allowed to stand vertically. Next, 1 g of sea sand having a particle diameter of 0.1 to 0.3 mm is packed on the absorbent cotton 1 so as to form a lower sea sand layer 3 in such a manner that the surface of the sea sand layer becomes flat. Thereafter, 1 g of the vinylidene fluoride polymer powder is packed on the surface of the lower sea sand layer 3 so as to form a vinylidene fluoride polymer powder layer 5 in such a manner that the boundary surface between this layer and the lower sea sand layer 3 as well as the surface of the vinylidene fluoride polymer powder layer become flat. Next, 1 g of sea sand having a particle diameter of 0.1 to 0.3 mm is packed on the surface of the vinylidene fluoride polymer powder layer 5 so as to form an upper sea sand layer 7 in such a manner that the boundary surface between this layer and the vinylidene fluoride polymer powder layer 5 as well as the surface of the sea sand layer become flat. When each of these layers is formed, the glass tube is usually tapped to make the surface flat. In the formation of the vinylidene fluoride polymer powder layer 5, the glass tube is tapped sufficient times (at least 100 times) until the thickness of the vinylidene fluoride polymer powder layer becomes uniform. Subsequently, 5 mL of N-methyl-2-pyrrolidone 9 stained with methylene blue (methylene blue concentration: 0.05% by mass) (liquid temperature: 23° C.) is poured onto the surface of the upper sea sand layer. After the passage of 3 minutes from the pouring, the depth D of penetration of the methylene blue-stained N-methyl-2-pyrrolidone 9 into the vinylidene fluoride polymer powder layer and the thickness L of the vinylidene fluoride polymer powder layer are measured. The penetration depth D is divided by the thickness L of the vinylidene fluoride polymer powder layer and the quotient is multiplied by 100 (100× penetration depth/thickness of vinylidene fluoride polymer powder layer=100 D/L) to give an N-methyl-2-pyrrolidone penetration rate. It is necessary that both the depth D of penetration into the vinylidene fluoride polymer powder layer and the thickness L of the vinylidene fluoride polymer powder layer be measured after the passage of 3 minutes. The reasons for this are because the depth D of penetration into the vinylidene fluoride polymer powder layer changes with time and the thickness L of the vinylidene fluoride polymer powder layer can be changed with time as a result of swelling.

The vinylidene fluoride polymer powder (A) in the invention preferably has vinylidene fluoride-derived monomer units at not less than 80 mol %, more preferably at not less than 90 mol %, and most preferably at not less than 95 mol % (wherein the total of all the monomer units is 100 mol %). Further, the vinylidene fluoride polymer powder (A) preferably has monomer units derived from a monomer other than vinylidene fluoride at not more than 20 mol %, more preferably at not more than 10 mol %, and most preferably at not more than 5 mol % (wherein the total of all the monomer units is 100 mol %). If the monomer units derived from vinylidene fluoride represent less than 80 mol %, the vinylidene fluoride polymer powder (A) is apt to form lumps when being dissolved in an aprotic polar solvent. The amounts of the monomer units from vinylidene fluoride and the monomer units from other comonomers may be determined by any known method such as NMR, elemental analysis or an oxygen flask combustion method.

The vinylidene fluoride polymer powder (A) in the invention preferably has a weight average molecular weight of not less than 200000, more preferably not less than 300000, and most preferably not less than 500000 as measured by gel permeation chromatography (GPC) relative to polystyrenes. The upper limit of the polystyrene equivalent weight average molecular weight is not particularly limited. However, the weight average molecular weight is preferably not more than 4000000 from the viewpoint of the solubility of the vinylidene fluoride polymer powder with respect to aprotic polar solvents such as NMP.

Preferably, differential scanning calorimetry of the vinylidene fluoride polymer powder (A) gives a DSC curve which has two or more crystal melting peaks and in which at least one sub-peak is observed at a temperature that is not less than 110° C. and is lower than the temperature giving rise to the crystal melting peak having the largest peak area (the main peak). It is more preferable that at least one sub-peak be observed at a temperature that is not less than 130° C. and is lower than the temperature giving rise to the main peak. It is particularly preferable that a sub-peak(s) be observed at a temperature that is from 132 to 162° C. and is lower than the temperature giving rise to the main peak.

The crystal melting temperature (Tm) of the vinylidene fluoride polymer powder (A) may be determined from the crystal melting peak having the largest peak area (the main peak). The crystal melting temperature is usually 130 to 180° C., and preferably 140 to 178° C.

In the invention, peaks having a smaller peak area than the main peak will be referred to as sub-peaks, and sub-peaks which are observed at a lower temperature than the main peak will be also referred to as lower-side meting points.

The vinylidene fluoride polymer powder (A) in the invention preferably has a median diameter of 1 to 250 μm, and more preferably 50 to 230 μm. This median diameter is advantageous in that the vinylidene fluoride polymer powder (A) exhibits excellent solubility and handling properties. The median diameter means a particle diameter that is associated with the midpoint (50%) of a cumulative particle size distribution curve, and is otherwise referred to as 50% average particle diameter (dp50). In the present invention, the median diameter is determined on the basis of volume-based particle size distribution. That is, the median diameter is located at the midpoint between the two equal total volumes of particles having a particle diameter larger than the median diameter and of particles having a particle diameter smaller than the median diameter.

The inventive vinylidene fluoride polymer powder (A) exhibits higher solubility with respect to aprotic polar solvents such as NMP than conventional vinylidene fluoride polymer powders.

There is a plurality of indicators for evaluating solubility. For example, solubility may be evaluated excellent when vinylidene fluoride polymer powder is added to NMP at room temperature and the vinylidene fluoride polymer powder is dispersed in the NMP, compared to when such vinylidene fluoride polymer powder forms lumps. According to another indicator, solubility may be evaluated to be higher as vinylidene fluoride polymer powder requires a shorter stirring time to be dissolved in NMP which has been heated at a specific temperature (for example, 50° C.).

Preferably, dissolving the vinylidene fluoride polymer powder (A) in an aprotic polar solvent results in a transparent vinylidene fluoride polymer solution. However, it is often the case that a translucent solution is obtained. Even such a translucent solution of the vinylidene fluoride polymer powder (A) may be used in order to form a power storage device electrode slurry or a power storage device electrode without causing any problems.

The vinylidene fluoride polymer powder (A) may be produced by any processes without limitation. For example, a process may be adopted in which raw vinylidene fluoride polymer powder is heat treated at such a temperature that the temperature of the polymer powder is not less than 100° C. to less than the crystal melting temperature (Tm) of the polymer, thereby obtaining heat-treated vinylidene fluoride polymer powder.

In such a production process, the heat-treated vinylidene fluoride polymer powder corresponds to the vinylidene fluoride polymer powder (A) of the invention. The raw vinylidene fluoride polymer powder is inferior in solubility with respect to aprotic polar solvents such as NMP to the inventive vinylidene fluoride polymer powder (A) (the heat-treated vinylidene fluoride polymer powder).

An exemplary process for producing the vinylidene fluoride polymer powder (A) will be described below with respect to a process for producing heat-treated vinylidene fluoride polymer powder.

[Process for Producing Heat-Treated Vinylidene Fluoride Polymer Powder]

In a process for producing heat-treated vinylidene fluoride polymer powder, raw vinylidene fluoride polymer powder is heat treated at such a temperature that the temperature of the polymer powder is not less than 100° C. to less than the crystal melting temperature (Tm) of the polymer. In terms of heat treatment conditions, there are two embodiments for carrying out the heat treatment in the process for producing heat-treated vinylidene fluoride polymer powder.

According to the first embodiment for the heat treatment, raw vinylidene fluoride polymer powder is heat treated at such a temperature that the temperature of the polymer powder is not less than 125° C. to less than the crystal melting temperature (Tm) of the polymer. In the first embodiment, it is preferable that the raw vinylidene fluoride polymer powder be heat treated while being allowed to stand, being fluidized in a stream of air, or being mechanically stirred.

According to the second embodiment for the heat treatment, raw vinylidene fluoride polymer powder is heat treated under high shear conditions at such a temperature that the temperature of the polymer powder is not less than 100° C. to less than the crystal melting temperature (Tm) of the polymer. In the second embodiment, the heat treatment is carried out while stirring the polymer powder using a Henschel mixer or the like under high shear conditions in which the stirring rotational speed is not less than 1 m/s, and preferably 3 to 100 m/s.

The heat-treated vinylidene fluoride polymer powder that is obtained by the above production process corresponds to the inventive vinylidene fluoride polymer powder (A) and exhibits higher solubility with respect to aprotic polar solvents such as NMP than conventional vinylidene fluoride polymer powders.

Here, the heat treatment is a treatment in which the raw vinylidene fluoride polymer powder is held at such a temperature that the temperature of the polymer powder is not less than 100° C. to less than the crystal melting temperature (Tm) of the polymer powder. Temporal heating such as flash drying raises the temperature of vinylidene fluoride polymer powder itself to a temperature that is lower than the temperature of the hot air. In contrast, the heat treatment in the present invention is not such a treatment that does not increase the temperature of vinylidene fluoride polymer powder to a sufficient level, but is a treatment in which the temperature of vinylidene fluoride polymer powder itself is in the range of not less than 100° C. to less than the crystal melting temperature (Tm) of the raw vinylidene fluoride polymer powder.

[Raw Vinylidene Fluoride Polymer Powder]

The raw vinylidene fluoride polymer powder will be described below. The raw vinylidene fluoride polymer powder is powder of a vinylidene fluoride polymer that has not been subjected to the heat treatment described later. Conventional vinylidene fluoride polymer powder may be used.

The raw vinylidene fluoride polymer powder is not limited as long as the polymer has monomer units derived from vinylidene fluoride. The polymers having vinylidene fluoride-derived monomer units are not particularly limited. Examples of such polymers include vinylidene fluoride homopolymers, copolymers of vinylidene fluoride and a comonomer, modified vinylidene fluoride homopolymers, and modified copolymers of vinylidene fluoride and a comonomer. These polymers are usually used singly, but two or more kinds may be used in combination.

Examples of the comonomers include carboxyl group-containing monomers, carboxylic anhydride group-containing monomers, fluorine-containing monomers excluding vinylidene fluoride, and α-olefins. The comonomers may be used singly, or two or more kinds may be used in combination.

Preferred examples of the carboxyl group-containing monomers include unsaturated monobasic acids, unsaturated dibasic acids, and monoesters of unsaturated dibasic acids, with unsaturated dibasic acids and monoesters of unsaturated dibasic acids being more preferable.

Examples of the unsaturated monobasic acids include acrylic acid. Examples of the unsaturated dibasic acids include maleic acid and citraconic acid. Preferred examples of the monoesters of unsaturated dibasic acids include those having 5 to 8 carbon atoms, such as monomethyl maleate, monoethyl maleate, monomethyl citraconate and monoethyl citraconate.

Of these, preferred carboxyl group-containing monomers are maleic acid, citraconic acid, monomethyl maleate and monomethyl citraconate.

Examples of the carboxylic anhydride group-containing monomers include unsaturated dibasic acid anhydrides. Examples of the unsaturated dibasic acid anhydrides include maleic anhydride and citraconic anhydride.

Examples of the fluorine-containing monomers excluding vinylidene fluoride include vinyl fluoride, trifluoroethylene, chlorotrifluoroethylene, tetrafluoroethylene and hexafluoropropylene.

Examples of the α-Olefins Include Ethylene, Propylene and 1-butene.

Preferred examples of the copolymers of vinylidene fluoride and a comonomer(s) include vinylidene fluoride/monomethyl maleate copolymer and vinylidene fluoride/hexafluoropropylene/monomethyl maleate copolymer.

Such copolymers of vinylidene fluoride and a comonomer may be obtained by copolymerizing vinylidene fluoride and any of the aforementioned comonomers.

Vinylidene fluoride may be homopolymerized or copolymerized with a comonomer by any method without limitation. Exemplary polymerization methods include suspension polymerization, emulsion polymerization and solution polymerization.

The polymerization conditions such as polymerization temperature may be selected appropriately. In the case of suspension polymerization as an example, the polymerization temperature is usually in the range of 20 to 120° C., preferably 25 to 100° C., and most preferably 25 to 75° C. Powder of a vinylidene fluoride polymer obtained by suspension polymerization at a polymerization temperature of 25 to 75° C. is preferable in that the use of such raw vinylidene fluoride polymer powder tends to result in heat-treated vinylidene fluoride polymer powder that exhibits excellent solubility with respect to aprotic polar solvents such as NMP.

Preferred polymerization methods are suspension polymerization and emulsion polymerization which afford a polymer having vinylidene fluoride-derived monomer units in the form of powder. Suspension polymerization is more preferred. In the case where a polymerization method is adopted which affords a polymer having vinylidene fluoride-derived monomer units in the form of powder, the polymer may be directly used as the raw vinylidene fluoride polymer powder or may be classified by a method such as sieving so as to have a specific particle diameter. When a polymerization method is adopted which affords a polymer having vinylidene fluoride-derived monomer units in the form of bulk (mass), the polymer may be pulverized into the form of powder by, for example, freeze crushing using liquid nitrogen according to the disclosure in JP-A-H06-108103, and such powder may be used as the raw vinylidene fluoride polymer powder in the invention.

The modified vinylidene fluoride homopolymer or the modified copolymer of vinylidene fluoride and a comonomer may be obtained by modifying any of the vinylidene fluoride homopolymers or the copolymers of vinylidene fluoride and a comonomer. A preferred modification is the introduction of a monomer having a carboxyl group or a carboxylic anhydride group such as maleic acid or maleic anhydride.

The raw vinylidene fluoride polymer powder preferably has vinylidene fluoride-derived monomer units at not less than 80 mol %, more preferably at not less than 90 mol %, and most preferably at not less than 95 mol % (wherein the total of all the monomer units is 100 mol %). Further, the raw vinylidene fluoride polymer powder preferably has monomer units derived from a monomer other than vinylidene fluoride at not more than 20 mol %, more preferably at not more than 10 mol %, and most preferably at not more than 5 mol % (wherein the total of all the monomer units is 100 mol %). If the monomer units derived from vinylidene fluoride represent less than 80 mol %, the raw vinylidene fluoride polymer powder is lowered in melting point and is apt to be fused during the heat treatment. In the event of fusion, the production generally becomes difficult. The heat treatment described later does not cause any change in the proportion of the vinylidene fluoride-derived monomer units in the vinylidene fluoride polymer powder. Thus, the proportion of the vinylidene fluoride-derived monomer units in the raw vinylidene fluoride polymer powder is identical with the proportion of the vinylidene fluoride-derived monomer units in the inventive vinylidene fluoride polymer powder (A) (the heat-treated vinylidene fluoride polymer powder). The amounts of the monomer units from vinylidene fluoride and the monomer units from other comonomers may be determined by any known method such as NMR, elemental analysis or an oxygen flask combustion method.

The raw vinylidene fluoride polymer powder preferably has a weight average molecular weight of not less than 200000, more preferably not less than 300000, and most preferably not less than 500000 as measured by gel permeation chromatography (GPC) relative to polystyrenes. The upper limit of the polystyrene equivalent weight average molecular weight is not particularly limited. However, the weight average molecular weight is preferably not more than 4000000 from the viewpoint of the solubility of the inventive vinylidene fluoride polymer powder with respect to aprotic polar solvents such as NMP. The heat treatment described later does not cause any change in the weight average molecular weight of the vinylidene fluoride polymer powder. Thus, the weight average molecular weight of the raw vinylidene fluoride polymer powder is identical with the weight average molecular weight of the inventive vinylidene fluoride polymer powder (A) (the heat-treated vinylidene fluoride polymer powder).

The raw vinylidene fluoride polymer powder preferably has a median diameter of 1 to 250 μm, and more preferably 50 to 230 μm. This median diameter ensures that the obtainable heat-treated vinylidene fluoride polymer powder exhibits excellent solubility and handling properties. The median diameter of the vinylidene fluoride polymer powder may be changed by the heat treatment described later.

The raw vinylidene fluoride polymer powder preferably has an inherent viscosity of 0.3 to 10 dl/g, and more preferably 1 to 5 dl/g. This inherent viscosity ensures that the obtainable heat-treated vinylidene fluoride polymer exhibits good mechanical properties and a solution of the polymer has excellent handling properties.

The raw vinylidene fluoride polymer powder usually has a crystal melting temperature (Tm) of 130 to 180° C. The crystal melting temperature may be determined from a DSC curve obtained by differential scanning calorimetry (hereinafter, also referred to as DSC). In the case where the DSC curve shows a plurality of crystal melting peaks (endothermic peaks), the crystal melting temperature (Tm) is determined on the basis of the peak having the largest peak area.

Commercial raw vinylidene fluoride polymer powder may be used.

[Heat Treatment]

In the process for producing heat-treated vinylidene fluoride polymer powder, the raw vinylidene fluoride polymer powder is heat treated at such a temperature that the temperature of the polymer powder is not less than 100° C. to less than the crystal melting temperature (Tm) of the polymer.

Here, the heat treatment is a treatment in which the raw vinylidene fluoride polymer powder is held at such a temperature that the temperature of the polymer powder is not less than 100° C. to less than the crystal melting temperature (Tm) of the polymer powder. Temporal heating such as flash drying raises the temperature of vinylidene fluoride polymer powder itself to a temperature that is lower than the temperature of the hot air. In contrast, the heat treatment in the present invention is not such a treatment that does not increase the temperature of vinylidene fluoride polymer powder to a sufficient level, but is a treatment in which the temperature of vinylidene fluoride polymer powder itself is in the range of not less than 100° C. to less than the crystal melting temperature (Tm) of the raw vinylidene fluoride polymer powder.

The heat treatment temperature is preferably not more than 180° C., and more preferably not more than 160° C. Temperatures in this range ensure that the heat-treated vinylidene fluoride polymer powder does not form lumps when being dissolved and exhibits excellent solubility.

As described hereinabove, two embodiments may be used in carrying out the heat treatment.

According to the first embodiment for the heat treatment, the raw vinylidene fluoride polymer powder is heat treated at such a temperature that the temperature of the polymer powder is not less than 125° C. to less than the crystal melting temperature (Tm) of the polymer. In the first embodiment, it is preferable that the raw vinylidene fluoride polymer powder be heat treated while being allowed to stand, being fluidized in a stream of air, or being mechanically stirred.

According to the second embodiment for the heat treatment, the raw vinylidene fluoride polymer powder is heat treated under high shear conditions at such a temperature that the temperature of the polymer powder is not less than 100° C. to less than the crystal melting temperature (Tm) of the polymer. In the second embodiment, the heat treatment is carried out while stirring the polymer powder using a Henschel mixer or the like under high shear conditions in which the stirring rotational speed is not less than 1 m/s, and preferably 3 to 100 m/s.

Preferably, the heat treatment according to the first embodiment is performed in such a manner that the raw vinylidene fluoride polymer powder is heat treated at such a temperature that the temperature of the polymer powder is not less than 130° C., preferably not less than 135° C., and is less than the crystal melting temperature (Tm) of the polymer. That is, the lower limit of the heat treatment temperature in a preferred embodiment of the first embodiment is 130° C. or above, and preferably 135° C. or above.

Preferably, the heat treatment according to the second embodiment is performed in such a manner that the raw vinylidene fluoride polymer powder is heat treated under high shear conditions at such a temperature that the temperature of the polymer powder is not less than 110° C., preferably not less than 125° C., and is less than the crystal melting temperature (Tm) of the polymer. That is, the lower limit of the heat treatment temperature in a preferred embodiment of the second embodiment is 110° C. or above, and preferably 125° C. or above.

As described above, the inventive vinylidene fluoride polymer powder (A) may be obtained even at a lower heat treatment temperature according to the second embodiment in which the raw vinylidene fluoride polymer powder is heat treated under high shear conditions, than according to the first embodiment in which the polymer powder is heat treated while being allowed to stand. Although the reason for this fact is not clear, the present inventors assume that high shear conditions produce strong friction on the surface of the polymer powder, and the frictional heat changes the structure near the surface of the polymer powder with the result that the inventive vinylidene fluoride polymer powder may be obtained even at a lower heat treatment temperature than in the first embodiment.

In the heat treatment, the heat treatment time is not particularly limited but is usually 10 seconds to 20 hours, more preferably 60 seconds to 20 hours, and most preferably 60 seconds to 5 hours. The heat treatment time in the invention means the duration of time for which the temperature of the polymer powder itself is within the above-described range of the heat treatment temperature.

The atmosphere in which the heat treatment is carried out is not particularly limited. For example, the heat treatment may be carried out in an air atmosphere or a nitrogen atmosphere. Further, the heat treatment may be performed under any of reduced pressure, increased pressure or atmospheric pressure, but is usually carried out under atmospheric pressure.

The heat treatment may be performed by any method without limitation. For example, the treatment may be carried out using a hot air circulation furnace, a Henschel mixer or a gear oven. In the case where the heat treatment is carried out in a hot air circulation furnace, a method may be adopted in which a box containing the raw vinylidene fluoride polymer powder is placed in the hot air circulation furnace. In the case where the heat treatment is carried out using a Henschel mixer, a method may be adopted in which the raw vinylidene fluoride polymer powder is added into the Henschel mixer and heated while being stirred.

<Vinylidene Fluoride Polymer Solution>

A vinylidene fluoride polymer solution according to the present invention is formed from the vinylidene fluoride polymer powder (A) (the heat-treated vinylidene fluoride polymer powder) and an aprotic polar solvent.

In detail, the vinylidene fluoride polymer solution may be obtained by dissolving the vinylidene fluoride polymer powder (A) in an aprotic polar solvent.

The vinylidene fluoride polymer powder (A) can be dissolved in an aprotic polar solvent such as NMP more quickly than any conventional vinylidene fluoride polymer powder.

Examples of the aprotic polar solvents include N-methyl-2-pyrrolidone, dimethylformamide and dimethylacetamide, with N-methyl-2-pyrrolidone being preferred.

The amount of the aprotic polar solvent, which forms the vinylidene fluoride polymer solution, is not particularly limited but is usually in the range of 400 to 10000 parts by weight, and preferably 550 to 2400 parts by weight with respect to 100 parts by weight of the vinylidene fluoride polymer powder (A).

The vinylidene fluoride polymer solution is usually produced by adding the vinylidene fluoride polymer powder (A) into an aprotic polar solvent and stirring the mixture.

In a process for producing the vinylidene fluoride polymer solution according to the present invention, it is preferable that the vinylidene fluoride polymer powder (A) be dissolved into an aprotic polar solvent at a liquid temperature of 35 to 130° C. It is more preferable that the vinylidene fluoride polymer powder (A) be dissolved into N-methyl-2-pyrrolidone at a liquid temperature of 35 to 130° C. When N-methyl-2-pyrrolidone is used as the aprotic polar solvent, the liquid temperature is particularly preferably in the range of 45 to 80° C. from the viewpoint of the solubility of the vinylidene fluoride polymer powder (A).

The vinylidene fluoride polymer powder (A) may be dissolved into an aprotic polar solvent at a liquid temperature of 35 to 130° C. in a manner such that the vinylidene fluoride polymer powder (A) is added to an aprotic polar solvent which has been heated to 35 to 130° C. and dissolved in the solvent, such that the vinylidene fluoride polymer powder (A) is added to an aprotic polar solvent at room temperature and the mixture is heated to 35 to 130° C. by a heater or the like so as to dissolve the polymer powder, or such that the vinylidene fluoride polymer powder (A) is added to an aprotic polar solvent at room temperature and the mixture is stirred at a high speed with a homogenizer, a disperser mixer or the like so as to heat the mixture to 35 to 130° C. by shear heating and thereby dissolve the polymer powder.

Alternatively, the vinylidene fluoride polymer powder (A) may be dissolved into an aprotic polar solvent by using a homogenizer, a disperser mixer, a propeller blade stirrer, T. K. FILMIX manufactured by PRIMIX Corporation, ultrasonic vibration or similar means. As required, the device may be fitted with a heater jacket or the like.

<Power Storage Device Electrode Slurry>

A power storage device electrode slurry according to the present invention is formed from the aforementioned vinylidene fluoride polymer solution and an active substance (first embodiment), or is formed from a mixture including the vinylidene fluoride polymer powder (A) and an active substance, and an aprotic polar solvent (second embodiment).

Examples of power storage devices include nonaqueous electrolyte secondary batteries (for example, lithium ion secondary batteries) and electric double layer capacitors. In particular, the power storage device electrode slurry of the invention may be preferably used in the production of a positive electrode of nonaqueous electrolyte secondary battery.

The power storage device electrode slurry according to the first embodiment may be obtained by mixing the vinylidene fluoride polymer solution together with an active substance. The mixing may be performed using a device such as a planetary mixer, a kneader, an internal mixer or T. K. FILMIX manufactured by PRIMIX Corporation.

The production of the power storage device electrode slurry according to the second embodiment involves mixing the vinylidene fluoride polymer powder (A) together with an active substance to give a mixture. The mixing may be performed using a device such as a planetary mixer, a paddle mixer, a Henschel mixer or a ribbon mixer. In the second embodiment, the obtained mixture is mixed together with an aprotic polar solvent to give the inventive slurry, and this mixing may be carried out using a device such as a planetary mixer, a kneader, an internal mixer or T. K. FILMIX manufactured by PRIMIX Corporation.

The aprotic polar solvent used in the second embodiment may be similar to the aprotic polar solvent described in <Vinylidene fluoride polymer solution>. The amount of the aprotic polar solvent used in the second embodiment is not particularly limited but is usually in the range of 400 to 10000 parts by weight, and preferably 550 to 2400 parts by weight with respect to 100 parts by weight of the vinylidene fluoride polymer powder (A).

The amount of the active substance contained in the power storage device electrode slurry is not particularly limited but is usually in the range of 100 to 10000 parts by weight, and preferably 900 to 6400 parts by weight with respect to 100 parts by weight of the vinylidene fluoride polymer powder (A) contained in the vinylidene fluoride polymer solution (the first embodiment) or 100 parts by weight of the vinylidene fluoride polymer powder (A) (the second embodiment).

Examples of the active substances include carbon materials, metal and alloy materials and metal oxides. Of these, metal oxides are preferable.

<Power Storage Device Electrode>

A power storage device electrode according to the present invention is formed from the above power storage device electrode slurry and a collector.

In detail, the power storage device electrode may be obtained by applying the power storage device electrode slurry to a collector and drying the slurry.

Examples of the collectors include copper, aluminum, nickel and gold. Exemplary forms of collectors include metal foils and metal meshes.

The power storage device electrode slurry is applied to at least one surface, and preferably both surfaces of the collector. The application methods are not particularly limited, and examples thereof include bar coating, die coating and comma coating.

After the slurry is applied, it is dried usually at a temperature of 50 to 150° C. for 1 to 300 minutes. The pressure during the drying is not particularly limited. However, the drying is usually carried out at atmospheric pressure or reduced pressure.

EXAMPLES

The present invention will be described in detail by presenting examples hereinbelow without limiting the scope of the invention.

Vinylidene fluoride polymer powders described later, and heat-treated vinylidene fluoride polymer powders obtained in Examples and Comparative Examples were tested by the following methods to evaluate properties.

[DSC Measurement]

Vinylidene fluoride polymer powders (1) to (9) described later, and heat-treated vinylidene fluoride polymer powders prepared in Examples and Comparative Examples (vinylidene fluoride polymer powders in Comparative Examples 1 and 3 to 10) were each analyzed by DSC using MDSC (Q100) manufactured by TA Instruments.

Approximately 2.0 mg of a sample (any of vinylidene fluoride polymer powders (1) to (9) described later, and heat-treated vinylidene fluoride polymer powders prepared in Examples and Comparative Examples (vinylidene fluoride polymer powders in Comparative Examples 1 and 3 to 10)) was weighed on an aluminum sample pan. While nitrogen was flowed at a flow rate of 50 mL/min, the temperature was increased from 30° C. to 230° C. at a rate of 5° C./min. During the temperature increase, the temperature was modulated at ±0.53° C./40 sec. Using a software (Universal Analysis 2000) included with Q100, the data was analyzed with Integrate Peak Linear command so as to determine the crystal melting temperature (Tm) from the main peak. Temperatures of peak tops which appeared at lower temperatures than the main peak were obtained as sub-peak melting points.

[Measurement of Inherent Viscosity]

A sample (any of vinylidene fluoride polymer powders (1) to (9) described later) weighing 4 g was added to 1 L of N,N-dimethylformamide and was dissolved therein at 80° C. in 8 hours to give a vinylidene fluoride polymer solution. While the solution was held at 30° C., the logarithmic viscosity was measured with an Ubbelohde viscometer. The inherent viscosity was determined from the following equation.

Inherent viscosity (logarithmic viscosity) $[\eta]=\ln(\eta rel)/C$ wherein ηrel=number of seconds required for sample solution to fall/number of seconds required for solvent to fall, and C=concentration of sample solution (0.4 g/dl).

[Evaluation of Molecular Weight by GPC]

The molecular weight of vinylidene fluoride polymer powders (1) to (9) described later was determined in the following manner. An N-methyl-2-pyrrolidone solution of the vinylidene fluoride polymer powder having a concentration of 0.1% by weight was analyzed with a gel permeation chromatograph (GPC-900 manufactured by JASCO Corporation, Shodex KD-806M column, temperature: 40° C.) in order to determine the weight average molecular weight relative to polystyrenes.

[Measurement of Particle Diameter]

Each of vinylidene fluoride polymer powders (1) to (9) described later, and heat-treated vinylidene fluoride polymer powders prepared in Examples and Comparative Examples (vinylidene fluoride polymer powders in Comparative Examples 1 and 3 to 10)) weighing 0.5 g was sufficiently wetted with 1 g of ethanol and was mixed together with 9 g of water. The mixture was stirred. Thereafter, 0.6 g of a 1% diluted solution of "SN WET 366" manufactured by SAN NOPCO LIMITED was added, and the mixture was mixed sufficiently. The resultant mixture was analyzed with a particle size distribution analyzer (SALD-3000S) manufactured by Shimadzu Corporation in order to determine the median diameter (dp50).

[Evaluation of Dispersibility]

NMP weighing 20 g was placed into a sample bottle having an inner diameter of 35 mm. While performing stirring with a stirrer chip (30 mm in length, 8 mm in central diameter, and 7 mm in edge diameter) at 400 rpm, 1 g of any of heat-treated vinylidene fluoride polymer powders prepared in Examples and Comparative Examples (vinylidene fluoride polymer powders in Comparative Examples 1 and 3 to 10)) was added, followed by stirring for 1 minute.

When the vinylidene fluoride polymer particles were aggregated into masses having a size of about several mm, the powder was evaluated to cause "lumps". When the particles were dispersed with a size that was approximately the same as an individual particle or about several times the size of an individual particle, the powder was evaluated to be "dispersed".

The dispersibility was evaluated at room temperature (23° C.)

[Evaluation of Dissolution Time]

After the dispersion state was evaluated, the sample bottle which contained any of the heat-treated vinylidene fluoride polymer powders from Examples and Comparative Examples (the vinylidene fluoride polymer powders in Comparative Examples 1 and 3 to 10) and NMP was set in a water bath at 50° C. While continuously performing stirring at 400 rpm, the contents were visually observed and the completion of dissolution was determined when there were no longer any solids or gels originating from the vinylidene fluoride polymer powder.

The phrase "when there were no longer any solids or gels originating from the vinylidene fluoride polymer powder" means that the dissolution was considered to complete when the system became a transparent solution as well as when the system formed a translucent solution without any solids or gels. Time was measured from when the bottle was set in the water bath until when the dissolution completed, thereby determining the dissolution time.

[Evaluation of Solution State]

NMP weighing 20 g was placed into a sample bottle having an inner diameter of 35 mm. While performing stirring with a stirrer chip (30 mm in length, 8 mm in central diameter, and 7 mm in edge diameter) at 400 rpm, 1 g of each vinylidene fluoride polymer powder was added, followed by stirring for 1 minute. Subsequently, the sample bottle containing any of the heat-treated vinylidene fluoride polymer powders from Examples and Comparative Examples (the vinylidene fluoride polymer powders in Comparative Examples 1 and 3 to 10) and NMP was set in a water bath which had been controlled at a predetermined temperature (40, 50, 60, 65 or 70° C.). The powder was dissolved by being stirred for a sufficient time. The obtained solution was visually evaluated to be "transparent" when the solution was clear, to be "turbid" when the solution was translucent, or to have "precipitation" when the solution contained precipitates.

[N-methyl-2-pyrrolidone Penetration Rate]

The N-methyl-2-pyrrolidone penetration rate was determined by an N-methyl-2-pyrrolidone penetration test described below.

A ball of absorbent cotton was packed at the bottom of a glass tube 25 cm in length and 8 mm in inner diameter, and the glass tube was held vertically (perpendicularly). Sea sand (manufactured by KANTO CHEMICAL CO., INC, particle diameter: 0.1 to 0.3 mm) weighing 1 g was poured onto the absorbent cotton. The tube was tapped several times so as to allow the surface of the sea sand to become flat, thereby forming a lower sea sand layer. On the lower sea sand layer, 1 g of any of the heat-treated vinylidene fluoride polymer powders from Examples and Comparative Examples (the vinylidene fluoride polymer powders in Comparative Examples 1 and 3 to 10) was poured in such a manner that the boundary surface between the polymer powder and the sea sand layer became flat. The tube was tapped (at least 100 times) until the packing state became substantially uniform. Further, the tube was tapped several times so as to allow the surface of the vinylidene fluoride polymer powder to become flat, thereby forming a vinylidene fluoride polymer powder layer on the lower sea sand layer.

Sea sand (manufactured by KANTO CHEMICAL CO., INC, particle diameter: 0.1 to 0.3 mm) weighing 1 g was poured onto the vinylidene fluoride polymer powder layer in such a manner that the boundary surface between the sea sand and the vinylidene fluoride polymer powder layer became flat. Thereafter, the tube was lightly tapped several times to allow the surface of the sea sand to become flat while avoiding the collapse of the boundary surface between the sea sand and the PVDF.

From the top of the glass tube, 5 mL of N-methyl-2-pyrrolidone stained with methylene blue (methylene blue concentration: 0.05% by mass) (liquid temperature: 23° C.) was poured onto the surface of the upper sea sand layer using a 5 mL-volume transfer pipet. After the passage of 3 minutes from the pouring of methylene blue-stained N-methyl-2-pyrrolidone, the depth of penetration of the methylene blue-stained N-methyl-2-pyrrolidone into the vinylidene fluoride polymer powder layer, as well as the thickness of the vinylidene fluoride polymer powder layer were measured. When the penetration depth was not uniform, the deepest penetration depth and the shallowest penetration depth were averaged to determine the penetration depth. The thickness of the vinylidene fluoride polymer powder layer indicates the distance from the boundary surface between the lower sea sand layer and the vinylidene fluoride polymer powder layer to the boundary surface between the upper sea sand layer and the vinylidene fluoride polymer powder layer.

The penetration depth was divided by the thickness of the vinylidene fluoride polymer powder layer and the quotient was multiplied by 100 (100× penetration depth/thickness of vinylidene fluoride polymer powder layer) to give an N-methyl-2-pyrrolidone penetration rate.

The N-methyl-2-pyrrolidone penetration rate will be also simply referred to as penetration rate.

Production Example 1

Production of Vinylidene Fluoride Polymer Powder (1)

A 2-L volume autoclave was charged with 1040 g of ion exchange water, 0.4 g of methylcellulose, 400 g of vinylidene fluoride monomer, 0.6 g of perbutyl peroxypivalate and 1.2 g of diethyl carbonate. Suspension polymerization was carried out at 65° C. for 7 hours.

After the completion of the polymerization, the obtained polymer slurry was heat treated at 95° C. for 30 minutes, dehydrated, washed with water, and dried at 80° C. for 20 hours. Thus, vinylidene fluoride polymer powder (1) was obtained.

The obtained vinylidene fluoride polymer powder (1) had an inherent viscosity of 2.3 dl/g, a weight average molecular weight of 850000, a median diameter of 194 μm, and Tm of 169° C.

Production Example 2

Production of Vinylidene Fluoride Polymer Powder (2)

A 2-L volume autoclave was charged with 1118 g of ion exchange water, 0.4 g of methylcellulose, 421 g of vinylidene fluoride monomer, 9 g of chlorotrifluoroethylene monomer, 2.5 g of diisopropyl peroxydicarbonate and 2.5 g of chlorofluorocarbon 225 cb. Suspension polymerization was carried out at 28° C. for 12 hours.

After the completion of the polymerization, the obtained polymer slurry was heat treated at 95° C. for 30 minutes, dehydrated, washed with water, and dried at 80° C. for 20 hours. Thus, vinylidene fluoride polymer powder (2) was obtained.

The obtained vinylidene fluoride polymer powder (2) had an inherent viscosity of 2.2 dl/g, a weight average molecular weight of 770000, a median diameter of 195 μm, and Tm of 171° C. The chlorine content in the vinylidene fluoride polymer powder (2) was analyzed in accordance with JIS K7229 to be 1.1 mol % in terms of chlorotrifluoroethylene monomer. That is, it was confirmed that the vinylidene fluoride polymer powder (2) contained 98.9 mol % of monomer units derived from vinylidene fluoride.

Production Example 3

Production of Vinylidene Fluoride Polymer Powder (3)

A 2-L volume autoclave was charged with 1026 g of ion exchange water, 0.2 g of methylcellulose, 400 g of vinylidene fluoride monomer, 2.4 g of di-n-propyl peroxydicarbonate, 2.4 g of methanol and 5.5 g of ethyl acetate. Suspension polymerization was carried out at 26° C. and subsequently at an elevated temperature of 40° C. for 12 hours.

After the completion of the polymerization, the obtained polymer slurry was heat treated at 95° C. for 30 minutes, dehydrated, washed with water, and dried. Thus, vinylidene fluoride polymer powder (3) was obtained. The drying was performed using a flash dryer under conditions such that the temperature of hot air was 140° C. at the entrance and 80° C. at the exit.

The obtained vinylidene fluoride polymer powder (3) had an inherent viscosity of 1.1 dl/g, a weight average molecular weight of 300000, a median diameter of 210 μm, and Tm of 173° C.

Production Example 4

Production of Vinylidene Fluoride Polymer Powder (4)

A 2-L volume autoclave was charged with 1026 g of ion exchange water, 0.2 g of methylcellulose, 400 g of vinylidene fluoride monomer, 2.4 g of di-n-propyl peroxydicarbonate, 2.4 g of methanol and 2.0 g of ethyl acetate. Suspension polymerization was carried out at 26° C. and subsequently at an elevated temperature of 40° C. for 11 hours.

After the completion of the polymerization, the obtained polymer slurry was heat treated at 95° C. for 30 minutes, dehydrated, washed with water, and dried. Thus, vinylidene fluoride polymer powder (4) was obtained. The drying was performed using a flash dryer under conditions such that the temperature of hot air was 140° C. at the entrance and 80° C. at the exit.

The obtained vinylidene fluoride polymer powder (4) had an inherent viscosity of 1.3 dl/g, a weight average molecular weight of 350000, a median diameter of 184 μm, and Tm of 173° C.

Production Example 5

Production of Vinylidene Fluoride Polymer Powder (5)

A 2-L volume autoclave was charged with 1024 g of ion exchange water, 0.2 g of methylcellulose, 400 g of vinylidene fluoride monomer, 1.4 g of diisopropyl peroxydicarbonate, 1.4 g of chlorofluorocarbon 225 cb and 3.0 g of ethyl acetate. Suspension polymerization was carried out at 26° C. for 16 hours.

After the completion of the polymerization, the obtained polymer slurry was heat treated at 95° C. for 30 minutes, dehydrated, washed with water, and dried. Thus, vinylidene fluoride polymer powder (5) was obtained. The drying was performed using a flash dryer under conditions such that the temperature of hot air was 140° C. at the entrance and 80° C. at the exit.

The obtained vinylidene fluoride polymer powder (5) had an inherent viscosity of 2.2 dl/g, a weight average molecular weight of 770000, a median diameter of 215 μm, and Tm of 173° C.

Production Example 6

Production of Vinylidene Fluoride Polymer Powder (6)

A 2-L volume autoclave was charged with 1024 g of ion exchange water, 0.2 g of methylcellulose, 400 g of vinylidene fluoride monomer, 0.6 g of diisopropyl peroxydicarbonate, 0.6 g of chlorofluorocarbon 225 cb and 1.9 g of ethyl acetate. Suspension polymerization was carried out at 26° C. for 20 hours.

After the completion of the polymerization, the obtained polymer slurry was heat treated at 95° C. for 30 minutes, dehydrated, washed with water, and dried. Thus, vinylidene fluoride polymer powder (6) was obtained. The drying was performed using a flash dryer under conditions such that the temperature of hot air was 140° C. at the entrance and 80° C. at the exit.

The obtained vinylidene fluoride polymer powder (6) had an inherent viscosity of 3.1 dl/g, a weight average molecular weight of 1100000, a median diameter of 220 and Tm of 173° C.

Production Example 7

Production of Vinylidene Fluoride Polymer Powder (7)

A 2-L volume autoclave was charged with 1040 g of ion exchange water, 0.4 g of methylcellulose, 400 g of vinylidene fluoride monomer, 0.32 g of perbutyl peroxypivalate and 2.0 g of diethyl carbonate. Suspension polymerization was carried out at 45° C. for 14 hours.

After the completion of the polymerization, the obtained polymer slurry was heat treated at 95° C. for 30 minutes, dehydrated, washed with water, and dried. Thus, vinylidene fluoride polymer powder (7) was obtained. The drying was performed using a flash dryer under conditions such that the temperature of hot air was 140° C. at the entrance and 80° C. at the exit.

The obtained vinylidene fluoride polymer powder (7) had an inherent viscosity of 2.2 dl/g, a weight average molecular weight of 770000, a median diameter of 203 μm, and Tm of 171° C.

In Examples and Comparative Examples, the following commercial vinylidene fluoride polymer powders were also used.
(Vinylidene Fluoride Polymer Powder (8))

PVDF powder, sold under the trade name of Solef 6020, manufactured by Solvay Solexis was used as vinylidene fluoride polymer powder (8). Solef 6020 had an inherent viscosity of 1.85 dl/g, a weight average molecular weight of 600000, a median diameter of 104 μm, and Tm of 170° C.
(Vinylidene Fluoride Polymer Powder (9))

PVDF powder, sold under the trade name of Kynar HSV900, manufactured by Arkema Inc. was used as vinylidene fluoride polymer powder (9). Kynar HSV900 had an inherent viscosity of 1.0 dl/g, a weight average molecular weight of 660000, a median diameter of 5 μm, and Tm of 160° C.

The above vinylidene fluoride polymer powders (1) to (9) were not still heat treated. That is, these powders correspond to the raw vinylidene fluoride polymer powders described hereinabove.

Example 1

The vinylidene fluoride polymer powder (6) weighing 10 g was placed into a kraft paper box 10 cm in width, 15 cm in length and 3 cm in height. The vinylidene fluoride polymer powder (6) was spread in the box in a uniform thickness.

The kraft paper box was closed with a kraft paper lid. The closed box was placed into a hot air circulation furnace (product name: Fine Oven DH410, manufactured by YAMATO SCIENTIFIC CO., LTD.) at 130° C. After the temperature of the vinylidene fluoride polymer powder (6) itself became 100° C., the temperature was further elevated to 110° C. in 30 seconds, still further to 120° C. in 54 seconds, thereafter to 125° C. in 54 seconds and finally to 130° C. in 5 minutes. The polymer powder was held at 130° C. for 52 minutes. Thereafter, the closed box was removed from the hot air circulation furnace and was allowed to stand at room temperature to cool. Thus, heat-treated vinylidene fluoride polymer powder (1) was obtained.

The heat-treated vinylidene fluoride polymer powder (1) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 2

Similarly to Example 1, the vinylidene fluoride polymer powder (6) weighing 10 g was placed into a kraft paper box 10 cm in width, 15 cm in length and 3 cm in height. The vinylidene fluoride polymer powder (6) was spread in the box in a uniform thickness.

The kraft paper box was closed with a kraft paper lid. The closed box was placed into a hot air circulation furnace (product name: Fine Oven DH410, manufactured by YAMATO SCIENTIFIC CO., LTD.) at 135° C. After the temperature of the vinylidene fluoride polymer powder (6) itself became 100° C., the temperature was further elevated to 110° C. in 30 seconds, still further to 120° C. in 42 seconds, thereafter to 125° C. in 30 seconds, further to 130° C. in 1 minute and finally to 135° C. in 5 minutes. The polymer powder was held at 135° C. for 52 minutes. Thereafter, the closed box was removed from the hot air circulation furnace and was allowed to stand at room temperature to cool. Thus, heat-treated vinylidene fluoride polymer powder (2) was obtained.

The heat-treated vinylidene fluoride polymer powder (2) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 3

Similarly to Example 1, the vinylidene fluoride polymer powder (6) weighing 10 g was placed into a kraft paper box 10 cm in width, 15 cm in length and 3 cm in height. The vinylidene fluoride polymer powder (6) was spread in the box in a uniform thickness.

The kraft paper box was closed with a kraft paper lid. The closed box was placed into a hot air circulation furnace (product name: Fine Oven DH410, manufactured by YAMATO SCIENTIFIC CO., LTD.) at 140° C. After the temperature of the vinylidene fluoride polymer powder (6) itself became 100° C., the temperature was further elevated to 110° C. in 24 seconds, still further to 120° C. in 30 seconds, thereafter to 125° C. in 24 seconds, further to 130° C. in 30 seconds, still further to 135° C. in 54 seconds and finally to 140° C. in 5 minutes. The polymer powder was held at 140° C. for 52 minutes. Thereafter, the closed box was removed from the hot air circulation furnace and was allowed to stand at room temperature to cool. Thus, heat-treated vinylidene fluoride polymer powder (3) was obtained.

The heat-treated vinylidene fluoride polymer powder (3) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 4

Similarly to Example 1, the vinylidene fluoride polymer powder (6) weighing 10 g was placed into a kraft paper box 10 cm in width, 15 cm in length and 3 cm in height. The vinylidene fluoride polymer powder (6) was spread in the box in a uniform thickness.

The kraft paper box was closed with a kraft paper lid. The closed box was placed into a hot air circulation furnace (product name: Fine Oven DH410, manufactured by YAMATO SCIENTIFIC CO., LTD.) at 150° C. After the temperature of the vinylidene fluoride polymer powder (6) itself became 100° C., the temperature was further elevated to 110° C. in 18 seconds, still further to 120° C. in 24 seconds, thereafter to 125° C. in 12 seconds, further to 130° C. in 18 seconds, still further to 135° C. in 24 seconds, thereafter to 140° C. in 30 seconds and finally to 150° C. in 6 minutes. The polymer powder was held at 150° C. for 51 minutes. Thereafter, the closed box was removed from the hot air circulation furnace and was allowed to stand at room temperature to cool. Thus, heat-treated vinylidene fluoride polymer powder (4) was obtained.

The heat-treated vinylidene fluoride polymer powder (4) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 5

Similarly to Example 1, the vinylidene fluoride polymer powder (6) weighing 10 g was placed into a kraft paper box 10 cm in width, 15 cm in length and 3 cm in height. The vinylidene fluoride polymer powder (6) was spread in the box in a uniform thickness.

The kraft paper box was closed with a kraft paper lid. The closed box was placed into a hot air circulation furnace (product name: Fine Oven DH410, manufactured by YAMATO SCIENTIFIC CO., LTD.) at 160° C. After the temperature of the vinylidene fluoride polymer powder (6) itself became 100° C., the temperature was further elevated to 110° C. in 12 seconds, still further to 120° C. in 18 seconds, thereafter to 125° C. in 12 seconds, further to 130° C. in 12 seconds, still further to 135° C. in 18 seconds, thereafter to 140° C. in 18 seconds, further to 150° C. in 1 minute and finally to 160° C. in 6 minutes. The polymer powder was held at 160° C. for 51 minutes. Thereafter, the closed box was removed from the hot air circulation furnace and was allowed to stand at room temperature to cool. Thus, heat-treated vinylidene fluoride polymer powder (5) was obtained.

The heat-treated vinylidene fluoride polymer powder (5) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 6

Similarly to Example 1, the vinylidene fluoride polymer powder (6) weighing 10 g was placed into a kraft paper box 10 cm in width, 15 cm in length and 3 cm in height. The vinylidene fluoride polymer powder (6) was spread in the box in a uniform thickness.

The kraft paper box was closed with a kraft paper lid. The closed box was placed into a hot air circulation furnace (product name: Fine Oven DH410, manufactured by YAMATO SCIENTIFIC CO., LTD.) at 125° C. After the temperature of the vinylidene fluoride polymer powder (6) itself became 100° C., the temperature was further elevated to 110° C. in 42 seconds, still further to 120° C. in 84 seconds and thereafter to 125° C. in 5 minutes. The polymer powder was held at 125° C. for 5 hours. Thereafter, the closed box was removed from the hot air circulation furnace and was allowed to stand at room temperature to cool. Thus, heat-treated vinylidene fluoride polymer powder (6) was obtained.

The heat-treated vinylidene fluoride polymer powder (6) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 7

Similarly to Example 1, the vinylidene fluoride polymer powder (6) weighing 10 g was placed into a kraft paper box 10 cm in width, 15 cm in length and 3 cm in height. The vinylidene fluoride polymer powder (6) was spread in the box in a uniform thickness.

The kraft paper box was closed with a kraft paper lid. The closed box was placed into a hot air circulation furnace (product name: Fine Oven DH410, manufactured by YAMATO SCIENTIFIC CO., LTD.) at 130° C. After the temperature of the vinylidene fluoride polymer powder (6) itself became 100° C., the temperature was further elevated to 110° C. in 30 seconds, still further to 120° C. in 54 seconds, thereafter to 125° C. in 54 seconds and finally to 130° C. in 5 minutes. The polymer powder was held at 130° C. for 19 hours and 52 minutes. Thereafter, the closed box was removed from the hot air circulation furnace and was allowed to stand at room temperature to cool. Thus, heat-treated vinylidene fluoride polymer powder (7) was obtained.

The heat-treated vinylidene fluoride polymer powder (7) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 1

The vinylidene fluoride polymer powder (6) obtained in Production Example 6 was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (6) from Production Example 6 which was not subjected to any heat treatment will be also referred to as vinylidene fluoride polymer powder (c1).

Comparative Example 2

Similarly to Example 1, the vinylidene fluoride polymer powder (6) weighing 10 g was placed into a kraft paper box 10 cm in width, 15 cm in length and 3 cm in height. The vinylidene fluoride polymer powder (6) was spread in the box in a uniform thickness.

The kraft paper box was closed with a kraft paper lid. The closed box was placed into a hot air circulation furnace (product name: Fine Oven DH410, manufactured by YAMATO SCIENTIFIC CO., LTD.) at 120° C. After the temperature of the vinylidene fluoride polymer powder (6) itself became 100° C., the temperature was further elevated to 110° C. in 1 minute and still further to 120° C. in 6 minutes. The polymer powder was held at 120° C. for 54 minutes. Thereafter, the closed box was removed from the hot air circulation furnace and was allowed to stand at room temperature to cool. Thus, heat-treated vinylidene fluoride polymer powder (c2) was obtained.

The heat-treated vinylidene fluoride polymer powder (c2) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 8

Heat-treated vinylidene fluoride polymer powder (8) was obtained in the same manner as in Example 3, except that the vinylidene fluoride polymer powder (6) was replaced by the vinylidene fluoride polymer powder (2).

The heat-treated vinylidene fluoride polymer powder (8) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 3

The vinylidene fluoride polymer powder (2) obtained in Production Example 2 was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (2) from Production Example 2 which was not subjected to any heat treatment will be also referred to as vinylidene fluoride polymer powder (c3).

Example 9

Heat-treated vinylidene fluoride polymer powder (9) was obtained in the same manner as in Example 1, except that the vinylidene fluoride polymer powder (6) was replaced by the vinylidene fluoride polymer powder (3).

The heat-treated vinylidene fluoride polymer powder (9) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 10

Heat-treated vinylidene fluoride polymer powder (10) was obtained in the same manner as in Example 3, except that the vinylidene fluoride polymer powder (6) was replaced by the vinylidene fluoride polymer powder (3).

The heat-treated vinylidene fluoride polymer powder (10) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 4

The vinylidene fluoride polymer powder (3) obtained in Production Example 3 was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (3) from Production Example 3 which was not subjected to any heat treatment will be also referred to as vinylidene fluoride polymer powder (c4).

Example 11

Heat-treated vinylidene fluoride polymer powder (11) was obtained in the same manner as in Example 3, except that the vinylidene fluoride polymer powder (6) was replaced by the vinylidene fluoride polymer powder (4).

The heat-treated vinylidene fluoride polymer powder (11) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 5

The vinylidene fluoride polymer powder (4) obtained in Production Example 4 was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (4) from Production Example 4 which was not subjected to any heat treatment will be also referred to as vinylidene fluoride polymer powder (c5).

Example 12

Heat-treated vinylidene fluoride polymer powder (12) was obtained in the same manner as in Example 3, except that the vinylidene fluoride polymer powder (6) was replaced by the vinylidene fluoride polymer powder (5).

The heat-treated vinylidene fluoride polymer powder (12) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 6

The vinylidene fluoride polymer powder (5) obtained in Production Example 5 was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (5) from Production Example 5 which was not subjected to any heat treatment will be also referred to as vinylidene fluoride polymer powder (c6).

Example 13

Heat-treated vinylidene fluoride polymer powder (13) was obtained in the same manner as in Example 1, except that the vinylidene fluoride polymer powder (6) was replaced by the vinylidene fluoride polymer powder (8).

The heat-treated vinylidene fluoride polymer powder (13) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 14

Heat-treated vinylidene fluoride polymer powder (14) was obtained in the same manner as in Example 3, except that the vinylidene fluoride polymer powder (6) was replaced by the vinylidene fluoride polymer powder (8).

The heat-treated vinylidene fluoride polymer powder (14) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 7

The vinylidene fluoride polymer powder (8) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (8) will be also referred to as vinylidene fluoride polymer powder (c7).

Example 15

Heat-treated vinylidene fluoride polymer powder (15) was obtained in the same manner as in Example 4, except that the vinylidene fluoride polymer powder (6) was replaced by the vinylidene fluoride polymer powder (9).

The heat-treated vinylidene fluoride polymer powder (15) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 8

The vinylidene fluoride polymer powder (9) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (9) will be also referred to as vinylidene fluoride polymer powder (c8).

Example 16

Heat-treated vinylidene fluoride polymer powder (16) was obtained in the same manner as in Example 3, except that the vinylidene fluoride polymer powder (6) was replaced by the vinylidene fluoride polymer powder (7).

The heat-treated vinylidene fluoride polymer powder (16) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 9

The vinylidene fluoride polymer powder (7) obtained in Production Example 7 was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (7) from Production Example 7 which was not subjected to any heat treatment will be also referred to as vinylidene fluoride polymer powder (c9).

Example 17

Heat-treated vinylidene fluoride polymer powder (17) was obtained in the same manner as in Example 4, except that the vinylidene fluoride polymer powder (6) was replaced by the vinylidene fluoride polymer powder (1).

The heat-treated vinylidene fluoride polymer powder (17) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 10

The vinylidene fluoride polymer powder (1) obtained in Production Example 1 was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

The vinylidene fluoride polymer powder (1) from Production Example 1 which was not subjected to any heat treatment will be also referred to as vinylidene fluoride polymer powder (c10).

Example 18

A Henschel mixer, sold under the trade name of FM10B/I from NIPPON COKE & ENGINEERING CO., LTD., was provided.

The vinylidene fluoride polymer powder (6) weighing 1 kg was added to the Henschel mixer and was heated from 25° C. to a temperature of 140° C. at 5° C./min at a blade rotational speed of 17.6 m/s.

During this process, after the temperature of the vinylidene fluoride polymer powder (6) itself became 100° C., the temperature was further elevated to 110° C. in 2 minutes, still further to 120° C. in 2 minutes, thereafter to 125° C. in 1 minute, further to 130° C. in 1 minute, still further to 135° C. in 1 minute and finally to 140° C. in 1 minute.

The polymer powder was sampled when its temperature reached 140° C. The sample was allowed to stand at room temperature to cool. Thus, heat-treated vinylidene fluoride polymer powder (18) was obtained.

The heat-treated vinylidene fluoride polymer powder (18) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 19

A Henschel mixer, sold under the trade name of FM10B/I from NIPPON COKE & ENGINEERING CO., LTD., was provided.

The vinylidene fluoride polymer powder (6) weighing 1 kg was added to the Henschel mixer and was heated from 25° C. to a temperature of 130° C. at 5° C./min at a blade rotational speed of 17.6 m/s.

During this process, after the temperature of the vinylidene fluoride polymer powder (6) itself became 100° C., the temperature was further elevated to 110° C. in 2 minutes, still further to 120° C. in 2 minutes, thereafter to 125° C. in 1 minute and finally to 130° C. in 1 minute.

The polymer powder was sampled when its temperature reached 130° C. The sample was allowed to stand at room temperature to cool. Thus, heat-treated vinylidene fluoride polymer powder (19) was obtained.

The heat-treated vinylidene fluoride polymer powder (19) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 20

A Henschel mixer, sold under the trade name of FM10B/I from NIPPON COKE & ENGINEERING CO., LTD., was provided.

The vinylidene fluoride polymer powder (5) weighing 1 kg was added to the Henschel mixer and was heated from 25° C. to a temperature of 130° C. at 5° C./min at a blade rotational speed of 17.6 m/s.

During this process, after the temperature of the vinylidene fluoride polymer powder (5) itself became 100° C., the temperature was further elevated to 110° C. in 2 minutes, still further to 120° C. in 2 minutes, thereafter to 125° C. in 1 minute and finally to 130° C. in 1 minute. After the temperature reached 130° C., the polymer powder was held at 130° C. for 20 minutes and was thereafter sampled. The sample was allowed to stand at room temperature to cool. Thus, heat-treated vinylidene fluoride polymer powder (20) was obtained.

The heat-treated vinylidene fluoride polymer powder (20) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 21

A Henschel mixer, sold under the trade name of FM10B/I from NIPPON COKE & ENGINEERING CO., LTD., was provided.

The vinylidene fluoride polymer powder (5) weighing 1 kg was added to the Henschel mixer and was heated from 25° C. to a temperature of 120° C. at 5° C./min at a blade rotational speed of 17.6 m/s.

During this process, after the temperature of the vinylidene fluoride polymer powder (5) itself became 100° C., the temperature was further elevated to 110° C. in 2 minutes and still further to 120° C. in 2 minutes. After the temperature reached 120° C., the polymer powder was held at 120° C. for 20 minutes and was thereafter sampled. The sample was allowed to stand at room temperature to cool. Thus, heat-treated vinylidene fluoride polymer powder (21) was obtained.

The heat-treated vinylidene fluoride polymer powder (21) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Example 22

A Henschel mixer, sold under the trade name of FM10B/I from NIPPON COKE & ENGINEERING CO., LTD., was provided.

The vinylidene fluoride polymer powder (5) weighing 1 kg was added to the Henschel mixer and was heated from 25° C. to a temperature of 110° C. at 5° C./rain at a blade rotational speed of 17.6 m/s.

During this process, after the temperature of the vinylidene fluoride polymer powder (5) itself became 100° C., the temperature was further elevated to 110° C. in 2 minutes. After the temperature reached 110° C., the polymer powder was held at 110° C. for 20 minutes and was thereafter sampled. The sample was allowed to stand at room temperature to cool. Thus, heat-treated vinylidene fluoride polymer powder (22) was obtained.

The heat-treated vinylidene fluoride polymer powder (22) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

Comparative Example 11

A Henschel mixer, sold under the trade name of FM10B/I from NIPPON COKE & ENGINEERING CO., LTD., was provided.

The vinylidene fluoride polymer powder (5) weighing 1 kg was added to the Henschel mixer and was heated from 25° C. to a temperature of 90° C. at 5° C./min at a blade rotational speed of 17.6 m/s.

After the temperature reached 90° C., the polymer powder was held at 90° C. for 20 minutes and was thereafter sampled. The sample was allowed to stand at room temperature to cool. Thus, heat-treated vinylidene fluoride polymer powder (c11) was obtained.

The heat-treated vinylidene fluoride polymer powder (c11) was tested by the aforementioned methods to determine the particle diameter (the median diameter), the crystal melting temperature (Tm), the sub-peak melting point (the lower-side melting point), the N-methyl-2-pyrrolidone penetration rate, the dispersibility, the dissolution time and the solution state.

In Examples and Comparative Examples, when the heat treatment was performed using a hot air circulation furnace, the temperature of the vinylidene fluoride polymer powder itself was measured by means of a thermocouple which was inserted in the layer of the vinylidene fluoride polymer powder in the kraft paper box. When the heat treatment was carried out using a Henschel mixer, the temperature of the vinylidene fluoride polymer powder was measured by means of a thermocouple which was inserted in the polymer powder inside the Henschel mixer.

The results in Examples and Comparative Examples are described in Tables 1 to 8.

TABLE 1

|  | VDF polymer powder (raw material) | Heat treatment conditions | | (Heat treated) VDF polymer powder (product) | Median diameter (μm) | Crystal melting temp. Tm (main peak) (° C.) | Lower side melting point (sub peak) (° C.) |
|---|---|---|---|---|---|---|---|
| Ex. 1 | (6) | 100-110° C. | 30 s | (1) | 210 | 173 | 134.7 |
|  |  | 110-120° C. | 54 s |  |  |  |  |
|  |  | 120-125° C. | 54 s |  |  |  |  |
|  |  | 125-130° C. | 5 min |  |  |  |  |
|  |  | 130° C. | 52 min |  |  |  |  |
| Ex. 2 | (6) | 100-110° C. | 30 s | (2) | 207 | 173 | 138.6 |
|  |  | 110-120° C. | 42 s |  |  |  |  |
|  |  | 120-125° C. | 30 s |  |  |  |  |
|  |  | 125-130° C. | 1 min |  |  |  |  |
|  |  | 130-135° C. | 5 min |  |  |  |  |
|  |  | 135° C. | 52 min |  |  |  |  |
| Ex. 3 | (6) | 100-110° C. | 24 s | (3) | 209 | 173 | 140.4 |
|  |  | 110-120° C. | 30 s |  |  |  |  |
|  |  | 120-125° C. | 24 s |  |  |  |  |
|  |  | 125-130° C. | 30 s |  |  |  |  |
|  |  | 130-135° C. | 54 s |  |  |  |  |
|  |  | 135-140° C. | 5 min |  |  |  |  |
|  |  | 140° C. | 52 min |  |  |  |  |
| Ex. 4 | (6) | 100-110° C. | 18 s | (4) | 205 | 173 | 152.9 |
|  |  | 110-120° C. | 24 s |  |  |  |  |
|  |  | 120-125° C. | 12 s |  |  |  |  |
|  |  | 125-130° C. | 18 s |  |  |  |  |
|  |  | 130-135° C. | 24 s |  |  |  |  |
|  |  | 135-140° C. | 30 s |  |  |  |  |
|  |  | 140-150° C. | 6 min |  |  |  |  |
|  |  | 150° C. | 51 min |  |  |  |  |

TABLE 1-continued

| | VDF polymer powder (raw material) | Heat treatment conditions | | (Heat treated) VDF polymer powder (product) | Median diameter (μm) | Crystal melting temp. Tm (main peak) (° C.) | Lower side melting point (sub peak) (° C.) |
|---|---|---|---|---|---|---|---|
| Ex. 5 | (6) | 100-110° C. | 12 s | (5) | 201 | 173 | 161.9 |
| | | 110-120° C. | 18 s | | | | |
| | | 120-125° C. | 12 s | | | | |
| | | 125-130° C. | 12 s | | | | |
| | | 130-135° C. | 18 s | | | | |
| | | 135-140° C. | 18 s | | | | |
| | | 140-150° C. | 1 min | | | | |
| | | 150-160° C. | 6 min | | | | |
| | | 160° C. | 51 min | | | | |
| Ex. 6 | (6) | 100-110° C. | 42 s | (6) | 208 | 173 | 132.0 |
| | | 110-120° C. | 84 s | | | | |
| | | 120-125° C. | 5 min | | | | |
| | | 125° C. | 5 h | | | | |
| Ex. 7 | (6) | 100-110° C. | 30 s | (7) | 212 | 173 | 138.4 |
| | | 110-120° C. | 54 s | | | | |
| | | 120-125° C. | 54 s | | | | |
| | | 125-130° C. | 5 min | | | | |
| | | 130° C. | 19 h 52 min | | | | |
| Comp. Ex. 1 | (6) | None | None | (c1) | 220 | 173 | 113.7 |
| Comp. Ex. 2 | (6) | 100-110° C. | 1 min | (c2) | 211 | 173 | 125.7 |
| | | 110-120° C. | 6 min | | | | |
| | | 120° C. | 54 min | | | | |

TABLE 2

| | Penetration depth D (mm) | Powder layer thickness L (mm) | Penetration rate | Dispersibility | Dissolution time at 50° C. | Solution state | | | | |
|---|---|---|---|---|---|---|---|---|---|---|
| | | | | | | 40° C. | 50° C. | 60° C. | 65° C. | 70° C. |
| Ex. 1 | 16.5 | 45.0 | 37% | Dispersed | 35 min | Turbid | Transparent | Transparent | Transparent | Transparent |
| Ex. 2 | 24.5 | 42.5 | 58% | Dispersed | 35 min | Turbid | Transparent | Transparent | Transparent | Transparent |
| Ex. 3 | 26.0 | 45.0 | 58% | Dispersed | 35 min | Turbid | Transparent | Transparent | Transparent | Transparent |
| Ex. 4 | 35.0 | 40.0 | 88% | Dispersed | 35 min | Turbid | Slightly turbid | Transparent | Transparent | Transparent |
| Ex. 5 | 45.0 | 45.0 | 100% | Dispersed | 35 min | Turbid Precipitation | Turbid | Transparent | Transparent | Transparent |
| Ex. 6 | 8.5 | 45.0 | 19% | Dispersed | 30 min | Turbid | Slightly turbid | Transparent | Transparent | Transparent |
| Ex. 7 | 24.5 | 45.0 | 54% | Dispersed | 25 min | Turbid | Turbid | Transparent | Transparent | Transparent |
| Comp. Ex. 1 | 2.0 | 47.0 | 4% | Lumps | 2.5 h | Transparent | Transparent | Transparent | Transparent | Transparent |
| Comp. Ex. 2 | 3.5 | 45.5 | 8% | Lumps | 4.5 h | Turbid | Transparent | Transparent | Transparent | Transparent |

TABLE 3

| | VDF polymer powder (raw material) | Heat treatment conditions | | (Heat treated) VDF polymer powder (product) | Median diameter (μm) | Crystal melting temp. Tm (main peak) (° C.) | Lower side melting point (sub peak) (° C.) |
|---|---|---|---|---|---|---|---|
| Ex. 8 | (2) | 100-110° C. | 24 s | (8) | 196 | 171 | 142.4 |
| | | 110-120° C. | 30 s | | | | |
| | | 120-125° C. | 24 s | | | | |
| | | 125-130° C. | 30 s | | | | |
| | | 130-135° C. | 54 s | | | | |
| | | 135-140° C. | 5 min | | | | |
| | | 140° C. | 52 min | | | | |

TABLE 3-continued

| | VDF polymer powder (raw material) | Heat treatment conditions | | (Heat treated) VDF polymer powder (product) | Median diameter (μm) | Crystal melting temp. Tm (main peak) (° C.) | Lower side melting point (sub peak) (° C.) |
|---|---|---|---|---|---|---|---|
| Comp. Ex. 3 | (2) | None | None | (c3) | 195 | 171 | 111.5 |
| Ex. 9 | (3) | 100-110° C. | 30 s | (9) | 211 | 173 | 134.7 |
| | | 110-120° C. | 54 s | | | | |
| | | 120-125° C. | 54 s | | | | |
| | | 125-130° C. | 5 min | | | | |
| | | 130° C. | 52 min | | | | |
| Ex. 10 | (3) | 100-110° C. | 24 s | (10) | 206 | 173 | 143.7 |
| | | 110-120° C. | 30 s | | | | |
| | | 120-125° C. | 24 s | | | | |
| | | 125-130° C. | 30 s | | | | |
| | | 130-135° C. | 54 s | | | | |
| | | 135-140° C. | 5 min | | | | |
| | | 140° C. | 52 min | | | | |
| Comp. Ex. 4 | (3) | None | None | (c4) | 210 | 173 | 113.1, 131.02 |
| Ex. 11 | (4) | 100-110° C. | 24 s | (11) | 184 | 173 | 143.5 |
| | | 110-120° C. | 30 s | | | | |
| | | 120-125° C. | 24 s | | | | |
| | | 125-130° C. | 30 s | | | | |
| | | 130-135° C. | 54 s | | | | |
| | | 135-140° C. | 5 min | | | | |
| | | 140° C. | 52 min | | | | |
| Comp. Ex. 5 | (4) | None | None | (c5) | 184 | 173 | 112.5, 128.0 |
| Ex. 12 | (5) | 100-110° C. | 24 s | (12) | 210 | 173 | 143.7 |
| | | 110-120° C. | 30 s | | | | |
| | | 120-125° C. | 24 s | | | | |
| | | 125-130° C. | 30 s | | | | |
| | | 130-135° C. | 54 s | | | | |
| | | 135-140° C. | 5 min | | | | |
| | | 140° C. | 52 min | | | | |
| Comp. Ex. 6 | (5) | None | None | (c6) | 215 | 173 | 113.5 |

TABLE 4

| | Penetration depth D (mm) | Powder layer thickness L (mm) | Penetration rate | Dispersibility | Dissolution time at 50° C. | Solution state | | | | |
|---|---|---|---|---|---|---|---|---|---|---|
| | | | | | | 40° C. | 50° C. | 60° C. | 65° C. | 70° C. |
| Ex. 8 | 16.0 | 50.0 | 32% | Dispersed | 30 min | Transparent | Transparent | Transparent | Transparent | Transparent |
| Comp. Ex. 3 | 2.0 | 51.0 | 4% | Lumps | 1.5 h | Transparent | Transparent | Transparent | Transparent | Transparent |
| Ex. 9 | 16.5 | 39.5 | 42% | Dispersed | 2 min | Turbid | Transparent | Transparent | Transparent | Transparent |
| Ex. 10 | 19.5 | 38.5 | 51% | Dispersed | 2 min | Turbid | Transparent | Transparent | Transparent | Transparent |
| Comp. Ex. 4 | 3.0 | 40.0 | 8% | Lumps | 10 min | Transparent | Transparent | Transparent | Transparent | Transparent |
| Ex. 11 | 25.0 | 40.0 | 63% | Dispersed | 5 min | Turbid | Transparent | Transparent | Transparent | Transparent |
| Comp. Ex. 5 | 3.0 | 42.5 | 7% | Lumps | 35 min | Transparent | Transparent | Transparent | Transparent | Transparent |
| Ex. 12 | 35.0 | 47.0 | 74% | Dispersed | 20 min | Turbid | Turbid | Transparent | Transparent | Transparent |
| Comp. Ex. 6 | 3.0 | 48.0 | 6% | Lumps | 60 min | Transparent | Transparent | Transparent | Transparent | Transparent |

TABLE 5

| | VDF polymer powder (raw material) | Heat treatment conditions | | (Heat treated) VDF polymer powder (product) | Median diameter (μm) | Crystal melting temp. Tm (main peak) (° C.) | Lower side melting point (sub peak) (° C.) |
|---|---|---|---|---|---|---|---|
| Ex. 13 | (8) | 100-110° C.<br>110-120° C.<br>120-125° C.<br>125-130° C.<br>130° C. | 30 s<br>54 s<br>54 s<br>5 min<br>52 min | (13) | 107 | 170 | 136.7 |
| Ex. 14 | (8) | 100-110° C.<br>110-120° C.<br>120-125° C.<br>125-130° C.<br>130-135° C.<br>135-140° C.<br>140° C. | 24 s<br>30 s<br>24 s<br>30 s<br>54 s<br>5 min<br>52 min | (14) | 106 | 170 | 143.4 |
| Comp. Ex. 7 | (8) | None | None | (c7) | 104 | 170 | 138.2 |
| Ex. 15 | (9) | 100-110° C.<br>110-120° C.<br>120-125° C.<br>125-130° C.<br>130-135° C.<br>135-140° C.<br>140-150° C.<br>150° C. | 18 s<br>24 s<br>12 s<br>18 s<br>24 s<br>30 s<br>6 min<br>51 min | (15) | 4 | 160 | 158.3 |
| Comp. Ex. 8 | (9) | None | None | (c8) | 5 | 160 | No sub peaks |
| Ex. 16 | (7) | 100-110° C.<br>110-120° C.<br>120-125° C.<br>125-130° C.<br>130-135° C.<br>135-140° C.<br>140° C. | 24 s<br>30 s<br>24 s<br>30 s<br>54 s<br>5 min<br>52 min | (16) | 200 | 171 | 143.5 |
| Comp. Ex. 9 | (7) | None | None | (c9) | 203 | 171 | 136.8 |
| Ex. 17 | (1) | 100-110° C.<br>110-120° C.<br>120-125° C.<br>125-130° C.<br>130-135° C.<br>135-140° C.<br>140-150° C.<br>150° C. | 18 s<br>24 s<br>12 s<br>18 s<br>24 s<br>30 s<br>6 min<br>51 min | (17) | 192 | 169 | 151.5 |
| Comp. Ex. 10 | (1) | None | None | (c10) | 194 | 169 | 143.1 |

TABLE 6

| | Penetration depth D (mm) | Powder layer thickness L (mm) | Penetration rate | Dispersibility | Dissolution time at 50° C. | Solution state | | | | |
|---|---|---|---|---|---|---|---|---|---|---|
| | | | | | | 40° C. | 50° C. | 60° C. | 65° C. | 70° C. |
| Ex. 13 | 5.5 | 25.0 | 22% | Dispersed | 2 min | Transparent | Transparent | Transparent | Transparent | Transparent |
| Ex. 14 | 32.0 | 32.0 | 100% | Dispersed | 10 min | Transparent | Transparent | Transparent | Transparent | Transparent |
| Comp. Ex. 7 | 1.0 | 25.0 | 4% | Lumps | 50 min | Transparent | Transparent | Transparent | Transparent | Transparent |
| Ex. 15 | 7.0 | 57.0 | 12% | Dispersed | 20 min | Turbid | Turbid | Turbid | Turbid | Turbid |
| Comp. Ex. 8 | 0.0 | 55.0 | 0% | Lumps | 60 min | Turbid | Turbid | Turbid | Turbid | Turbid |
| Ex. 16 | 31.0 | 65.0 | 48% | Dispersed | 10 min | Transparent | Transparent | Transparent | Transparent | Transparent |
| Comp. Ex. 9 | 4.0 | 65.0 | 6% | Lumps | 25 min | Transparent | Transparent | Transparent | Transparent | Transparent |
| Ex. 17 | 50.0 | 70.0 | 71% | Dispersed | 20 min | Transparent | Transparent | Transparent | Transparent | Transparent |
| Comp. Ex. 10 | 3.5 | 76.5 | 5% | Lumps | 50 min | Transparent | Transparent | Transparent | Transparent | Transparent |

TABLE 7

| | VDF polymer powder (raw material) | Heat treatment conditions | | (Heat treated) VDF polymer powder (product) | Median diameter (μm) | Crystal melting temp. Tm (main peak) (° C.) | Lower side melting point (sub peak) (° C.) |
|---|---|---|---|---|---|---|---|
| Ex. 18 | (6) | 100-110° C. | 2 min | (18) | 207 | 173 | 138.4 |
| | | 110-120° C. | 2 min | | | | |
| | | 120-125° C. | 1 min | | | | |
| | | 125-130° C. | 1 min | | | | |
| | | 130-135° C. | 1 min | | | | |
| | | 135-140° C. | 1 min | | | | |
| Ex. 19 | (6) | 100-110° C. | 2 min | (19) | 210 | 173 | 130 |
| | | 110-120° C. | 2 min | | | | |
| | | 120-125° C. | 1 min | | | | |
| | | 125-130° C. | 1 min | | | | |
| Ex. 20 | (5) | 100-110° C. | 2 min | (20) | 213 | 173 | 136.5 |
| | | 110-120° C. | 2 min | | | | |
| | | 120-125° C. | 1 min | | | | |
| | | 125-130° C. | 1 min | | | | |
| | | 130° C. | 20 min | | | | |
| Ex. 21 | (5) | 100-110° C. | 2 min | (21) | 213 | 173 | 125.7 |
| | | 110-120° C. | 2 min | | | | |
| | | 120° C. | 20 min | | | | |
| Ex. 22 | (5) | 100-110° C. | 2 min | (22) | 215 | 173 | 116.6 |
| | | 110° C. | 20 min | | | | |
| Comp. Ex. 11 | (5) | 90° C. | 20 min | (c11) | 214 | 173 | 102.5 |

TABLE 8

| | Penetration depth D (mm) | Powder layer thickness L (mm) | Penetration rate | Dispersibility | Dissolution time at 50° C. | Solution state | | | | |
|---|---|---|---|---|---|---|---|---|---|---|
| | | | | | | 40° C. | 50° C. | 60° C. | 65° C. | 70° C. |
| Ex. 18 | 43.5 | 43.5 | 100% | Dispersed | 30 min | Turbid | Turbid | Transparent | Transparent | Transparent |
| Ex. 19 | 44.0 | 44.0 | 100% | Dispersed | 60 min | Turbid | Turbid | Transparent | Transparent | Transparent |
| Ex. 20 | 35.5 | 35.5 | 100% | Dispersed | 25 min | Turbid | Slightly turbid | Slightly turbid | Transparent | Transparent |
| Ex. 21 | 23.0 | 37.0 | 62% | Dispersed | 20 min | Slightly turbid | Slightly turbid | Transparent | Transparent | Transparent |
| Ex. 22 | 14.0 | 35.5 | 39% | Dispersed | 20 min | Slightly turbid | Transparent | Transparent | Transparent | Transparent |
| Comp. Ex. 11 | 3.7 | 38.0 | 10% | Lumps | 60 min | Slightly turbid | Transparent | Transparent | Transparent | Transparent |

REFERENCE SIGNS LIST

1 . . . ABSORBENT COTTON
3 . . . LOWER SEA SAND LAYER
5 . . . VINYLIDENE FLUORIDE POLYMER POWDER LAYER
7 . . . UPPER SEA SAND LAYER
9 . . . METHYLENE BLUE-STAINED N-METHYL-2-PYRROLIDONE
D . . . DEPTH OF PENETRATION OF METHYLENE BLUE-STAINED N-METHYL-2-PYRROLIDONE INTO VINYLIDENE FLUORIDE POLYMER POWDER LAYER AFTER PASSAGE OF 3 MINUTES FROM POURING
L . . . THICKNESS OF VINYLIDENE FLUORIDE POLYMER POWDER LAYER AFTER PASSAGE OF 3 MINUTES FROM POURING

The invention claimed is:
1. Vinylidene fluoride polymer powder having an N-methyl-2-pyrrolidone penetration rate of 12 to 100% as measured by an N-methyl-2-pyrrolidone penetration test described below:

N-methyl-2-pyrrolidone penetration test: a glass tube 8 mm in inner diameter which is packed with absorbent cotton at a lower portion is allowed to stand vertically; 1 g of sea sand having a particle diameter of 0.1 to 0.3 mm is packed on the absorbent cotton so as to form a lower sea sand layer in such a manner that the surface of the sea sand layer becomes flat; 1 g of the vinylidene fluoride polymer powder is packed on the surface of the lower sea sand layer so as to form a vinylidene fluoride polymer powder layer in such a manner that the boundary surface between this layer and the lower sea sand layer as well as the surface of the vinylidene fluoride polymer powder layer become flat; 1 g of sea sand having a particle diameter of 0.1 to 0.3 mm is packed on the surface of the vinylidene fluoride polymer powder layer so as to form an upper sea sand layer in such a manner that the boundary surface between this layer and the vinylidene fluoride polymer powder layer as well as the surface of the sea sand layer become flat;

subsequently, 5 mL of N-methyl-2-pyrrolidone stained with methylene blue (methylene blue concentration:

0.05% by mass) (liquid temperature: 23° C.) is poured onto the surface of the upper sea sand layer; after the passage of 3 minutes from the pouring, the depth of penetration of the methylene blue-stained N-methyl-2-pyrrolidone into the vinylidene fluoride polymer powder layer and the thickness of the vinylidene fluoride polymer powder layer are measured; and the penetration depth is divided by the thickness of the vinylidene fluoride polymer powder layer and the quotient is multiplied by 100 (100 x penetration depth/thickness of vinylidene fluoride polymer powder layer) to give an N-methyl-2-pyrrolidone penetration rate, wherein the vinylidene fluoride polymer powder is a vinylidene fluoride homopolymer, and wherein the vinylidene fluoride polymer powder is produced by heat treating raw vinylidene fluoride polymer powder at such a temperature that the temperature of the polymer powder is not less than 125° C. to less than a crystal melting temperature of the polymer.

2. The vinylidene fluoride polymer powder according to claim 1, which has a weight average molecular weight of not less than 200000 as measured by gel permeation chromatography relative to polystyrenes.

3. The vinylidene fluoride polymer powder according to claim 2, wherein differential scanning calorimetry of the vinylidene fluoride polymer powder gives a DSC curve which has two or more crystal melting peaks and in which at least one sub-peak is observed at a temperature that is not less than 110° C. and is lower than the temperature giving rise to the crystal melting peak having the largest peak area (the main peak).

4. The vinylidene fluoride polymer powder according to claim 1, wherein differential scanning calorimetry of the vinylidene fluoride polymer powder gives a DSC curve which has two or more crystal melting peaks and in which at least one sub-peak is observed at a temperature that is not less than 110° C. and is lower than the temperature giving rise to the crystal melting peak having the largest peak area (the main peak).

5. A power storage device electrode slurry formed from a mixture including the vinylidene fluoride polymer powder described in claim 4 and an active substance, and an aprotic polar solvent.

6. The vinylidene fluoride polymer powder according to claim 1, which has a median diameter of 1 to 250 µm.

7. A power storage device electrode slurry formed from a mixture including the vinylidene fluoride polymer powder described in claim 6 and an active substance, and an aprotic polar solvent.

8. A vinylidene fluoride polymer solution obtained from the vinylidene fluoride polymer powder described in claim 1 and an aprotic polar solvent.

9. A vinylidene fluoride polymer solution obtained from the vinylidene fluoride polymer powder described in claim 1 and N-methyl-2-pyrrolidone.

10. A power storage device electrode slurry formed from the vinylidene fluoride polymer solution described in claim 9 and an active substance.

11. A power storage device electrode slurry formed from the vinylidene fluoride polymer solution described in claim 8 and an active substance.

12. A power storage device electrode produced from the power storage device electrode slurry described in claim 11 and a collector.

13. A power storage device electrode slurry formed from a mixture including the vinylidene fluoride polymer powder described in claim 1 and an active substance, and an aprotic polar solvent.

14. A power storage device electrode produced from the power storage device electrode slurry described in claim 13 and a collector.

15. The vinylidene fluoride polymer powder according to claim 1, where said heat treatment of the raw vinylidene fluoride polymer power is at such a temperature that the temperature of the polymer powder is not less than 130° C. to less and not more than 180° C.

16. The vinylidene fluoride polymer powder according to claim 15, where the raw vinylidene fluoride polymer power is obtained by said heat treatment while being mechanically stirred.

17. The vinylidene fluoride polymer powder according to claim 1, where said heat treatment of the raw vinylidene fluoride polymer power is at such a temperature that the temperature of the polymer powder is not less than 125° C. to less and not more than 160° C.

* * * * *